Jan. 4, 1955  J. J. FERNANDEZ  2,698,621
SURGICAL INSTRUMENT
Filed July 21, 1953  2 Sheets-Sheet 1
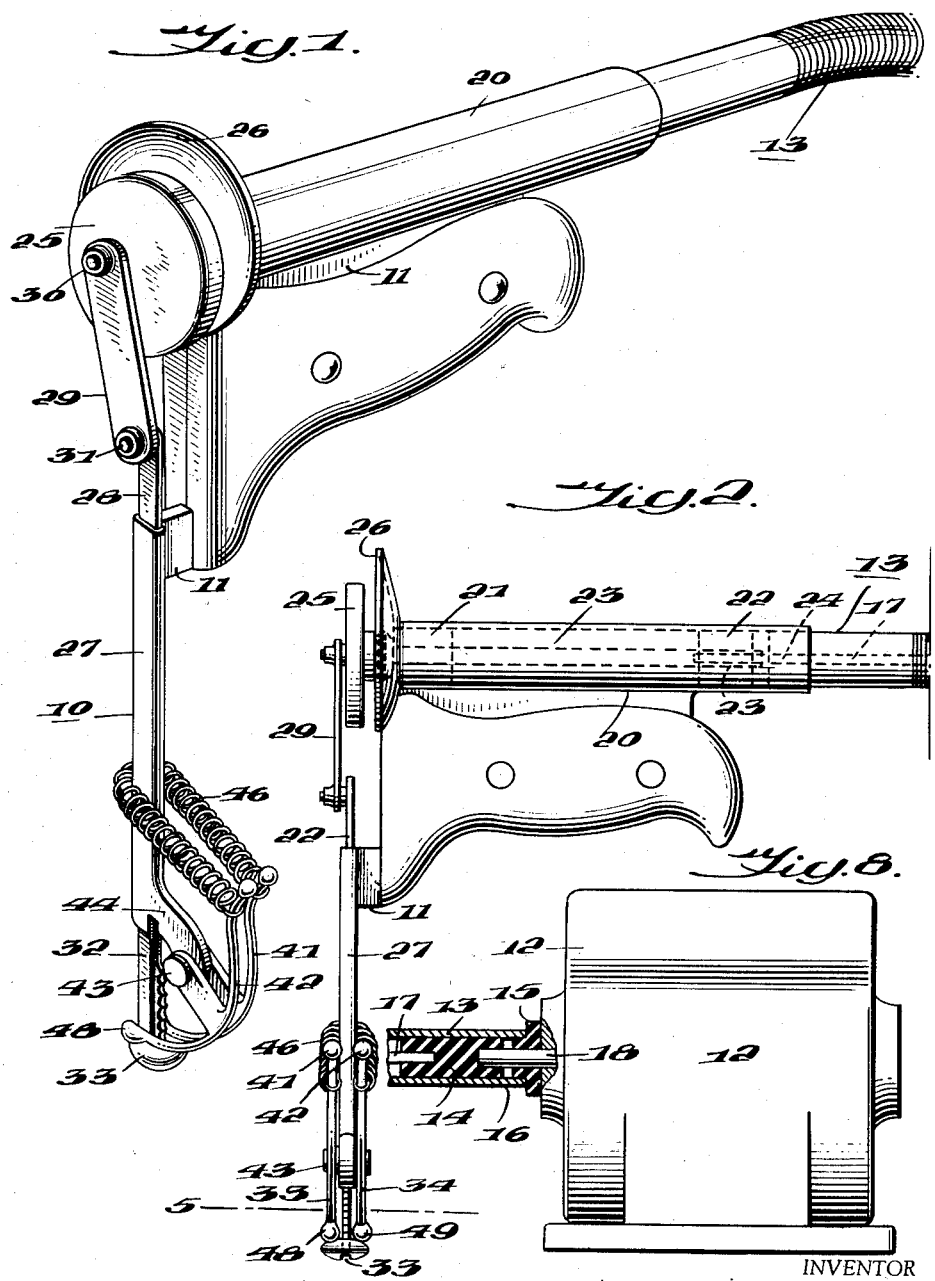
INVENTOR
JOHN J. FERNANDEZ,
BY Chas. M. Finkhouser
ATTORNEY

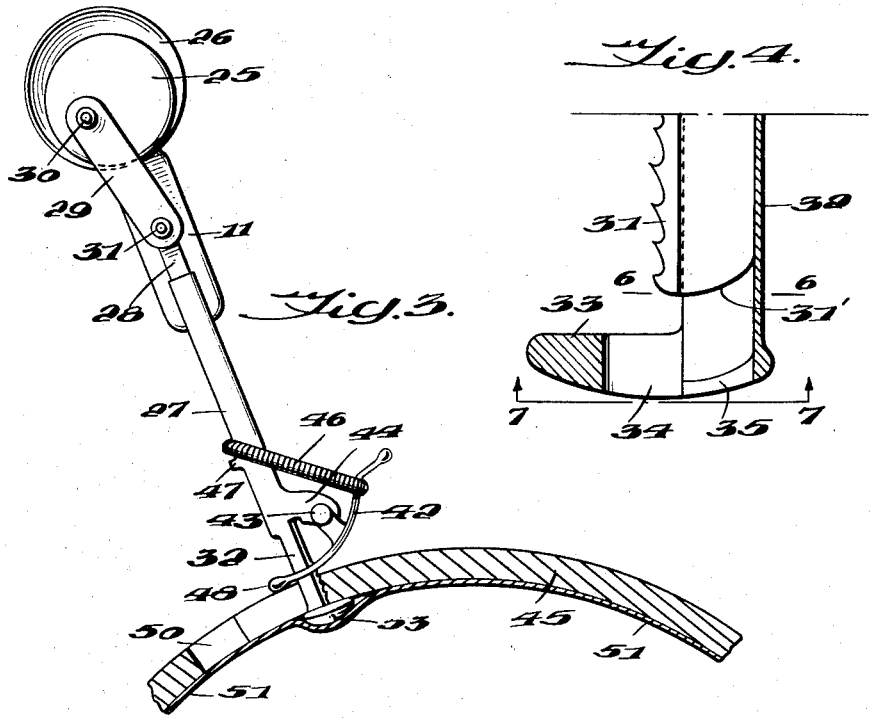

United States Patent Office 2,698,621
Patented Jan. 4, 1955

2,698,621

SURGICAL INSTRUMENT

John J. Fernandez, Baltimore, Md., assignor of one-half to George S. Renard, Baltimore, Md.

Application July 21, 1953, Serial No. 369,379

8 Claims. (Cl. 128—317)

This invention relates to surgical instruments and more particularly to surgical instruments of the cutting or saw type. One important use for a surgical saw of the character designated is that of cutting out a section of skull bone so that the same may be removed whenever it is necessary to perform an operation on the brain for any reason.

Various types, constructions and arrangements of surgical saws have heretofore been proposed but none of these have been found to be successful in meeting the many practical and exacting requirements for an instrument of this type.

An important object of the present invention is to provide a novel surgical saw implement which shall be simple, durable and rugged in construction and operate more efficiently than similar devices heretofore employed for cutting and removing skull bone sections or the like.

Another object of the invention is to provide a surgical saw of the character designated comprising a novel arrangement and construction of saw and operating parts which shall provide maximum efficiency and safety in the handling and functioning of the saw during the skull bone cutting operation.

A further object of the invention is to provide an instrument of the character designated which shall include a novel form of reciprocating saw blade, and guide support therefor which shall facilitate cutting skull bone of varying thickness and at different angles and contours.

A further object of the invention is to provide a novel form of saw blade construction and associated guide portions which shall reduce vibration to a minimum and provide maximum safety in operation.

A further object of the invention is to provide a novel form of saw blade and cooperating parts which shall cut only on the up stroke and thereby minimize the possibility of any bone chips being carried into contact with the brain dura tissues which are next to the brain on the underside of the skull bone.

A further object of the invention is to provide a surgical saw apparatus having a minimum number of moving parts and so accessible that the same may be easily cleaned and sterilized without damage to the saw parts or deterioration of the operating mechanism therefor.

A still further object of the invention is to provide a surgical saw of the character designated which shall be fully insulated against any static electric shock which might possibly reach the brain while cutting out the skull bone section.

These and other objects of the invention will be more manifest from the following description and more particularly set forth in the claims.

In the drawings:

Figure 1 is a perspective view of a surgical saw embodying novel parts constructed and arranged in accordance with the present invention;

Figure 2 is a side view in elevation of the apparatus shown in Fig. 1;

Fig. 3 is a front view in elevation of the apparatus shown in Fig. 1, and in position to cut a skull bone;

Fig. 4 is an enlarged fragmentary view partially in section of the saw blade and foot guide;

Fig. 5 is a section on line 5—5, Fig. 1;

Fig. 6 is an enlarged sectional view showing the inwardly flexed guide walls;

Fig. 7 is a bottom view of the foot shown in Fig. 4; and

Fig. 8 is a view in elevation of the motor and insulation coupling connections.

Referring to Figs. 1, 2 and 3 of the drawings, there is shown a surgical saw instrument embodying my invention wherein a saw assembly is indicated by the numeral 10. This unit or assembly is supported by a metal frame part 11 in the form of a central plate and arranged to provide a convenient handle in the form of a pistol grip as illustrated in the drawings. The saw unit 10 is located and mounted at one end of the frame 11 and extends downwardly therefrom and at right angles thereto. The mechanism for operating the saw includes a convenient source of power such as an electric motor 12 and which is connected thereto by a flexible shafting 13 of the conventional type as shown in Fig. 8, and hereinafter more fully described.

It has been found that in using an instrument of this kind every precaution must be taken to prevent any danger of electric shock from reaching the brain, and to reduce this hazard to a minimum, the saw and the motor are separated at a distance and the shaft driving and coupling connections are completely insulated from each other. The rotary drive shaft includes a coupling 14 of insulation material and a bushing 15 of insulation material connects and mounts an outer stationary sheath 16 of the shafting 13 with the motor casing 12. The coupling 14 connects an inner flexible rotary drive shaft 17 with a shaft 18 which in this illustration is a direct connection with the motor 12. Thus it will be noted that all the electrical connections are so far removed from the proximity of the saw instrument that any danger of electric shock from any source during the normal operation of the device is effectively eliminated. This is particularly true since there are no electrical switch connections near the handle of the instrument.

The frame 11 includes a top tubular portion or member 20 which is provided with spaced apart interior bearings 21—22 arranged to support a rotary drive shaft 23 as shown in dotted lines. This shaft is connected at one end to the interior rotary flexible shaft element 17 by a spline connection 24, also shown in dotted lines. The other end of shaft 23 is connected to a crank arm 25 for reciprocating the saw as hereinafter described. The crank 25 is protected by a disc-shaped guard member 26 formed integrally with the portion 20 and located adjacent to the hand grip portion of the instrument.

The saw unit 10 includes a relatively long flat tubular member 27 in the form of a hollow guide adapted to receive and enclose a saw bar member 28 throughout the greater portion of its length. The upper end of the bar 28 is connected to the crank 25 by a link 29 and pivot pins 30 and 31 respectively. The lower end of the bar projects from the lower extremity of the guide tube 27 and the projecting portion contains a plurality of novel saw teeth 31 curved upwardly and designed to cut only in an upward direction or on the up-stroke of the saw blade as illustrated in Figs. 4 and 5.

The guide member 27 terminates in a slender substantially U shaped open channel member 32 and an oblate shaped foot member 33 having an aperture 34 formed therein. Located on the inside of the aperture 34 is a stop member in the form of a flange or rib 35 arranged in the path of the saw so as to prevent any accidental passage of the saw blade extremity past the foot in the case of any saw breakage. This is an important feature because in any operation on the brain requiring the use of the saw it is imperative that all precautions be taken to prevent any accidental protrusion of the saw blade beyond the guide foot.

The saw blade portion containing the teeth 31 is of novel construction in that the teeth are relatively broad as compared to the body portion of the saw bar and the overall thickness of the guide 33. It will be noted that the bottom tooth at the end of the bar 28 is curved from the cutting edge of the tooth rearwardly to the rear of the saw body as indicated by numeral 31'. This feature prevents bone chips from being carried down in opening 34 during reciprocation of the saw. It is this novel design of saw tooth that particularly lends it to be self-clearing and more efficient in operation. The arrangement is such that the saw bar body portion carrying the teeth 31 is slightly tapered in cross-section, as shown by the numeral 36, Fig. 5, and thus provides flanges 37—38 which ride on the top edges of yieldable side wall members 39—40 provided as an integral part of extension guide member 32 as shown in Figs. 5 and 6. The guide channel 32 is essentially U-shaped to provide an open guide channel for receiving and rigidly supporting the saw blade at the region of work cutting. The sides 39 and 40 of the channel guide are of relatively light spring steel material so that they will be flexed outwardly as the blade moves through the guide as shown in Fig. 6. In other words the channel sides open and close during the reciprocation of the blade during the sawing movement. Furthermore, the tapered portion of the saw blade moving in the flexible walled channel guide frictionally holds the blade in guiding position and effectively reduces vibration during reciprocation.

Another feature of the particular arrangement of the guide being in substantially the same vertical axis with the saw is that the saw may be turned on its vertical axis in short radius and thus allow the same to be manipulated with greater ease and accuracy during any exacting cutting movements.

The lower end of guide tube 27 carries a pair of arcuate shaped, spaced apart, work engaging members 41—42 pivotally mounted on a support pivot pin 43 mounted on opposite sides of a bracket arm 44 extending forwardly of the saw teeth. The arcuate members have their free extremities on opposite sides and in close proximity to the upper curved sides of the foot member 33 so as to engage a skull bone 45 as indicated in Fig. 3. As shown, the foot 33 rides along the under surface of the skull bone and between the dura brain tissue indicated by the numeral 51, and the guides 41—42 act as pressure feet or guides, move along so as to steady the saw and hold it in pressure contact with the work during the cutting movement. The guides are controlled in their individual movement by a spring member 46 which may be in the form of a coil spring, having its ends connecting the free extremities of the two pivoted members 41 and 42. The spring is held in position over the rear of the guide support 27 by a projection 47. This arrangement provides a simple construction which enables the independent movement of the two work guides 41—42 on opposite sides of the foot member 33 against the work at all times and at any angular cut. The extremities of the guides 41 and 42 in contact with the skull bone 45 are rounded as shown at 48 and 49 so as to travel with a minimum of resistance and hand effort in manipulating the saw.

From the foregoing the operation of the surgical saw will be apparent. The skull bone is prepared by cutting a small opening 50 large enough to receive the saw foot 33 and the desired cut is started. The longitudinal axis of the saw guide 27 and the saw bar 28 being substantially coincident as a single member, the saw is manipulated with greater ease and visibility of the work as the cut proceeds at any contour or angle. The feature of the saw tooth design permitting cutting only on the up-stroke of the saw causes bone chips to be thrown upwardly and outwardly from the cut. The flexible saw guides partially close the U-shaped channel during reciprocation of the saw and this minimizes the collection of any bone chips about the saw blade which might possibly be carried into contact with the brain tissues. A further advantage of the saw bar and guide construction is that it provides a saw with maximum strength and minimum of moving parts which also enables the operator to have clear visibility of the saw when making a cut.

Having thus described a surgical saw constructed and arranged in accordance with my invention, it is also apparent that various changes may be made therein without departing from the scope of the invention as set forth in the following claims.

What I claim is:

1. A surgical saw instrument including a saw member, a frame, a substantially flat tubular shaped guide member on one end of said frame adapted to support said saw, the lower extremity of said tubular member including an open U-shaped portion, the side walls of said portion normally flexed inward to guide and retain the saw during movement therein.

2. Apparatus of the character described in claim 1 in which the saw blade is substantially T-shaped and having a tapered body portion to fit the channel portion of the U-shaped guide.

3. Apparatus of the character described in claim 1 in which the flexible side walls of the guide substantially close the channel of the guide and are flexed open during contact with the blade.

4. Apparatus of the character described in claim 1 in which the lower extremity of the U-shaped guide is provided with a foot member having a partially closed aperture at the bottom of the guide and of smaller cross-section than said saw.

5. Apparatus of the character described in claim 1 in which the U-shaped guide member is provided with a foot member at the lower extremity thereof and yieldable, independently movable guide members carried by the U-shaped guide for holding the foot in contact with the work.

6. A surgical saw instrument including a handle frame, a relatively long flat tubular saw guide rigidly connected to said frame and depending therefrom, a reciprocable saw bar enclosed in said guide, said saw bar extending beyond the lower extremity of said guide, and having saw teeth wider than said bar, a substantially U-shaped channel guide member at the lower extremity of the tubular guide and having side walls flexed inwardly to engage the underside of the saw teeth and the saw bar, and means for reciprocating the saw bar.

7. Apparatus of the character described in claim 6 including means at the lower extremity of said saw bar to deflect bone chips away from the saw cut.

8. Apparatus of the character described in claim 6 including an electric motor for reciprocating the saw and means for insulating the saw parts from the motor-driving parts.

References Cited in the file of this patent

UNITED STATES PATENTS 2,547,707    Karle                 Apr. 3, 1951

FOREIGN PATENTS 466,515    France               Mar. 4, 1914
540,550    Germany            Dec. 22, 1931